United States Patent Office 3,439,002
Patented Apr. 15, 1969

3,439,002
THIOARYLOXYANTHRIMIDES
Guido R. Genta, Pitcairn, Pa., assignor to American
Aniline Products, Inc., a corporation of Delaware
No Drawing. Filed Apr. 16, 1963, Ser. No. 273,273
Int. Cl. C09b 1/48, 1/16
U.S. Cl. 260—367
5 Claims This invention relates to thioaryloxyanthrimide dyes. In one specific aspect, it relates to a new process involving the reaction of a halo-substituted anthrimide and a thiophenol to give new dyes which are remarkably useful for coloring rigid and non-rigid plastics.

Anthrimides, or anthraquinonyl amines, were first reported in the literature by Isler in 1905. Soon after their discovery, the anthrimides became accepted commercially as vat dyes. They are no longer popular for this purpose because they possess only moderate affinity for cotton and have only fair fastness properties. Anthrimides, as a class, have not been recognized as good plastic colors.

I have discovered a new class of anthrimides, made by the condensation of a haloanthrimide with a thiophenol, which are unexpectedly good plastic colors and are characterized by remarkable lightfastness. The thioaryloxy groups of my new anthrimides appear to improve the solubility of the dye in molten plastic, which greatly enhances the depth of shade that can be achieved.

It is, therefore, an object of the invention to provide a new class of dyes, the thioaryloxyanthrimides, which are particularly useful as colorants for rigid and non-rigid plastics because of their good solubility in plastics and excellent lightfastness.

In accordance with the invention, I have discovered new dyes of the formula:

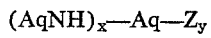

In the above formula, Aq represents an anthraquinone nucleus. Z is a member selected from the group consisting of SR and $SO_2R$, wherein R is phenyl, lower alkyl phenyl, benzyl, halobenzyl, lower alkoxy phenyl, or halophenyl. $x$ is an integer having a value of 1–4 and $y$ is an integer having a value of 1–2.

The dyes of the invention wherein Z is SR are made by reacting a chloroanthrimide of the formula:

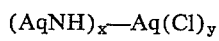

wherein Aq, $x$ and $y$ are defined as foresaid with one or two moles (depending on the value of $y$) per mole of anthrimide of a compound of the formula RSH, wherein R is as defined aforesaid. The reaction takes place in the presence of a halogen acceptor in a polar organic solvent having a boiling point of at least 120° C., and the dye is recovered from the reaction mixture by conventional methods.

The preparation of the dyes of the invention is illustrated by the following equation, showing the reaction of 4-chlorotetranthrimide with thiophenol to give 4-thiophenoxy-1,5,8-tris(anthraquinonylamino)-anthraquinone.

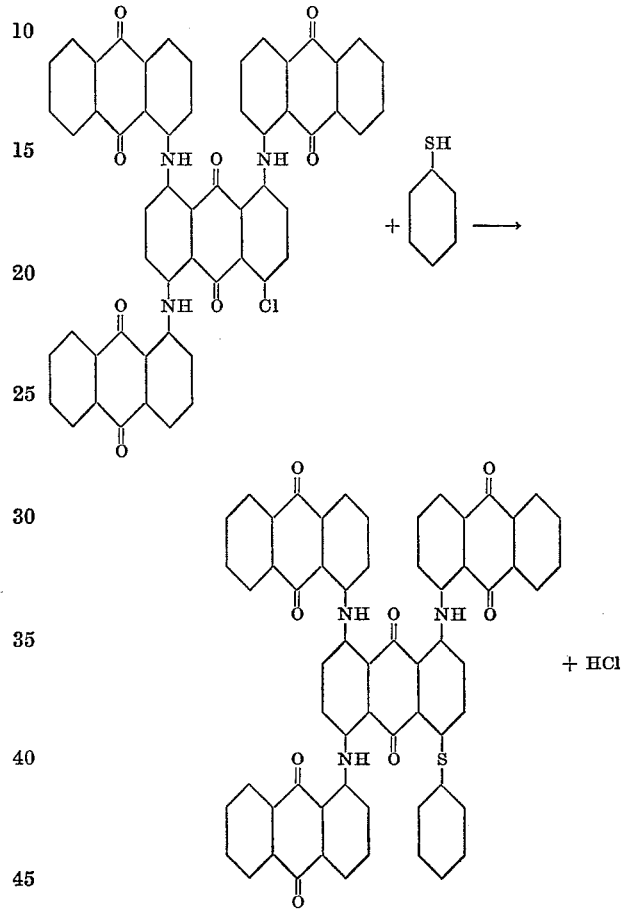

The basic starting materials for use in the invention are the mono- or dichloroanthrimides, including dianthrimides; e.g. 5 - chloro - 1,1' - dianthrimide, 4,5 - dichloro-1,1'-dianthrimide; trianthrimides; e.g. 4'-chloro-1',4,1,1''-trianthrimide, 5'-chloro-1',4,1,1''-trianthrimide, 4',5'-dichloro-1',4,1,1''-trianthrimide, tetranthrimides; e.g. 4- chloro 1,5,8 - tris(anthraquinonylamino)anthraquinone, 4,5 - dichloro - 1,5,8 - tris(anthraquinonylamino)anthraquinone, and pentanthrimides; e.g. 4-(4'-chloroanthraquinonylamino) - 1,5,8 - tris - anthraquinonylamino)anthraquinone, and the like.

The anthrimides are commercially available or they can be obtained by the condensation of a haloanthraquinone with an aminoanthraquinone. The condensation reactions are carried out in a high boiling inert organic solvent, e.g. nitrobenzene or naphthalene, in the presence of an acid binding agent, such as sodium carbonate or sodium acetate. A modification of the method, wherein the ingredients are baked together without the use of a solvent, is described in Tinker, U.S. 2,420,022.

Thiophenols useful in the invention include thiophenol, o-, m- and p-chlorothiophenol, o-, m- and p-bromothiophenol, o-, m- and p-methoxythiophenol, o-, m- and p-ethoxythiophenol, benzyl mercaptan, and the like.

Useful products can be made by condensing either one or two moles of one or more of the aforesaid thiophenols with one mole of the chloroanthrimide, depending upon the number of available chlorines on the chloroanthrimide.

The reaction is conducted in the presence of a high boiling polar organic solvent, i.e. a solvent having a boiling point of at least 120° C. Useful solvents include ethylene glycol monomethyl ether, ethylene glycol monoethyl ether, n-amyl alcohol, Cellosolve Acetate, diacetone alcohol, ethylene glycol, benzyl alcohol, diethylene glycol, butyl Cellosolve, sulfolane, dimethylformamide, dimethylacetamide, and the like.

The reaction takes place at a temperature between 120° C. and the boiling point of the particular solvent used. At temperatures below 120° C. the reaction does not proceed at commercially useful rates. The preferred temperature is between 125 and 180° C. If desired, the reaction can be carried out under an inert atmosphere, e.g. nitrogen gas, to protect the thiophenol from oxidation.

The reaction is carried out in the presence of a halogen acceptor, preferably an alkali metal hydroxide, an alkali metal carbonate, or alkali metal acetate. Useful halogen acceptors include potassium hydroxide, sodium hydroxide, sodium carbonate, potassium carbonate, sodium acetate, and the like. At least one equivalent of halogen acceptor is required for each chlorine present on the chloroanthrimide. An excess of halogen acceptor can be used, but no particular advantage is obtained thereby.

The reaction can be carried out in the presence of a catalyst if desired. Particularly useful catalysts include copper-bronze, metallic copper, and copper salts, such as copper acetate, copper sulfate, copper carbonate, and the like. The catalysts are effective in amounts ranging between 1–5 percent by weight of anthrimide.

The reaction generally takes from 10 to 30 hours. After the reaction is complete, the mixture is allowed to cool to 30–60° C. with agitation. The product is separated by filtration and, if desired, washed with alcohol, water, or both.

Products of the invention wherein Z of the formula is $SO_2R$, rather than SR, are easily made by treating the SR-containing dyes, dissolved in a strong acid, such as glacial acetic acid or concentrated sulfuric acid (85–100% by weight) with at least a stoichiometric amount of an oxidizing agent, such as aqueous hydrogen peroxide, or an alkali metal hypohalite, such as sodium hypochlorite, potassium hypochlorite, lithium hypochlorite, and the like. The oxidation is continued until there is no further color change. The aqueous oxidizing agent is conveniently added as a 5–30 percent by weight solution. More dilute solutions are undesirable because they unnecessarily increase the volume of the reaction medium, and more concentrated solutions are usually less stable.

The conversion of anthrimides to their thioaryloxy derivatives not only improves to a considerable extent the solubility of the compounds in plastics, but results in a distinct color change. The tetranthrimides and pentanthrimides are olive and violet in color, respectively; the novel thioaryloxy derivatives are jet black. The behavior of these new dyes in dilute amounts is particularly surprising; the shade dilutes to a true neutral gray of excellent lightfastness, instead of to a bluish or reddish shade as is often found in other so-called blacks. Dianthrimides are ordinarily yellow, their thioaryloxy derivatives are orange. The orange trianthrimides are converted to excellent reds according to the method of the invention.

The dyes of the invention are useful in the coloration of plastics derived from vinyl monomers, particularly poly α-olefins, e.g. polyethylene; polyacrylates, e.g. polymethylmethacrylate and polyacrylonitrile; copolymers of styrene and butadiene; and polymers of vinylaryl monomers, e.g. polystyrene, styrene and α-methylstyrene, and the like. The dyes can be easily applied by dissolving from 0.5–5 percent by weight of the monomer prior to polymerization, or alternatively, by dissolving the dye in the molten plastic.

My invention is further illustrated by the following examples:

EXAMPLE I

A 500 ml. flask equipped with a stirrer, heater and thermometer was charged with 150 ml. benzyl alcohol, 20 g. chloropentanthrimide, obtained by the condensation of 1,2,4,5,8-pentachloroanthraquinone with four moles of 1-aminoanthraquinone, 10 g. thiophenol, 5 g. potassium hydroxide flakes and 1 g. copper powder. The charge was heated to 165° C. while stirring and maintained at that temperature for 24 hours. The reaction was then diluted with 150 ml. denatured ethyl alcohol. The mass was allowed to cool to 40° C. with stirring. The product was collected on a filter and washed with three 50 ml. portions of 50 percent ethyl alcohol and subsequently with water until the washings were neutral. There was obtained 19.5 g. thiophenoxypentanthrimide, a jet black dye, which was shown by elemental analysis to be free of chloride.

A 200 mg. quantity of the dye and 200 g. methylmethacrylate molding powder were run over a Thropp Mill for 10–15 minutes at a temperature of 145–160° C. to incorporate the color. The colored plastic was taken off of the mill and pressed into a jet black disc.

EXAMPLE II

A 500 ml. flask equipped with stirrer, heater and thermometer was charged with 200 ml. benzyl alcohol, 40 g. α-chlorotetranthrimide, 10 g. thiophenol, 5 g. potassium hydroxide flakes and 1 g. copper powder. The mixture was heated in a nitrogen atmosphere for 24 hours at 165–170° C., during which time water was permitted to distill out. The mixture was then allowed to cool below 50° C. There was then added 200 ml. of denatured ethyl alcohol. The resulting mixture was then permitted to stand overnight without stirring. The product was collected on a filter and the cake was washed with 100 ml. alcohol. The cake was then boiled in 1 percent hydrochloric acid for one hour. The product was again collected on a filter and washed neutral with water. There was thus obtained 35.5 g. of 4-thiophenoxy-1,5,8-tris(anthraquinonylamino)anthraquinone (4-thiophenoxytetranthrimide), a jet black dye.

A 1 g. quantity of the dye was dissolved in 100 g. styrene monomer. After polymerization in bulk there was obtained a jet black polystyrene.

EXAMPLE III

A 500 ml. flask equipped with stirrer, heater and thermometer was charged with 200 ml. benzyl alcohol, 45 g. chlorotrianthrimide, obtained by condensing 1,4,5-trichloroanthraquinone with two moles of 1-aminoanthraquinone, 15 g. thiophenol, 7.5 g. potassium hydroxide flakes, and 1.5 g. copper powder. The mixture was heated for 24 hours in a nitrogen atmosphere at 170–175° C., during which time a lower boiling fraction was permitted to distill out. The reaction mass was then allowed to cool to 60° C., at which temperature it was diluted with 200 ml. ethanol and stirred overnight. After filteration, the resulting cake was washed first with 100 ml. ethanol, followed by a wash with 1 percent boiling hydrochloric acid solution. The final product was again collected on a filter and was washed with water and dried. Forty g. α-thiophenoxytrianthrimide was obtained, which dyed polymethylmethacrylate in red shades very fast to light.

If in the above example the thiophenol used is replaced by benzyl mercaptan, a very similar red dye is obtained.

EXAMPLE IV

The procedure of the preceeding example was repeated with the exception that chlorodianthrimide, obtained by condensing 1,8-dichloroanthraquinone with one mole of 1-aminoanthraquinone, was used instead of the chlorotrianthrimide. The resulting dye gave in polymethylmethacrylate deep orange shades of excellent fastness to light.

When in this example thiophenol was replaced by thiocresol, a similar dye was obtained having very similar properties.

EXAMPLE V

A 250 ml. flask equipped with stirrer was charged with 100 ml. glacial acetic acid, 10 g. thiophenoxyanthrimide, obtained by the procedure of Example IV, was then added and at room temperature 10 ml. of a 30 percent aqueous hydrogen peroxide solution was added dropwise. The reaction mixture was cooled to keep the temperature below 25° C. It was stirred overnight at 20–25° C., then it was poured out onto ice, filtered and washed acid free. After drying, 10 g. of phenylsulfonyldianthrimide was obtained, which dyed polymethylmethacrylate in somewhat lighter shades than the starting material. The dyeings had equally good fastness properties.

EXAMPLE VI

The thiophenoxytrianthrimide obtained as described in Example III was transformed into a paste by dissolving it in five parts 96 percent sulfuric acid and pouring the solution thus obtained onto ice. The wet cake obtained from 10 g. thiophenoxytrianthrimide, after filtering and washing acid free, consisted of finely divided particles. It was slurried in a beaker containing additional water in order to give a smooth slurry. A few drops of caustic soda were added to the slurry and, after heating to 65–70° C., enough sodium hypochlorite solution was added until there was a positive test to KI-paper lasting for one hour. The phenylsulfone obtained was filtered, washed and dried. It also dyed plastic materials red shades very fast to light.

I claim:
1. A dye of the formula:

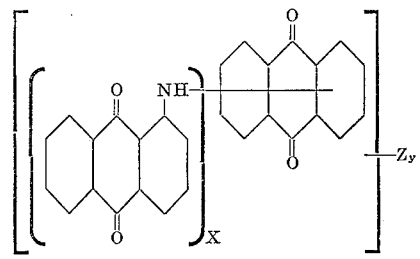

wherein Z is a member selected from the group consisting of SR and SO₂R wherein R is a member selected from the group consisting of phenyl, benzyl, halozbenzyl, lower alkylphenyl, lower alkoxyphenyl, and halophenyl, y is an integer having a value of 1–2, and x is an integer having a value of 2–4, each anthraquinonylamino group being attached to anthraquinone in an α-position, and when x is 4, y is 1.

2. A dye of claim 1 wherein Z is SR, R is phenyl, x is 3 and y is 1.
3. A dye of claim 1 wherein Z is SR, R is phenyl, x is 4 and y is 1.
4. A dye of claim 1 wherein Z is SO₂R, R is phenyl, x is 2 and y is 1.
5. A dye of claim 1 wherein Z is SR, R is benzyl, x is 2 and y is 1.

References Cited

UNITED STATES PATENTS

| | | | |
|---|---|---|---|
| 2,534,136 | 12/1950 | Lantz et al. | 260—41 |
| 2,691,640 | 10/1954 | Patterson et al. | 260—41 |
| 2,585,682 | 2/1952 | Randall et al. | 260—367 |
| 2,863,883 | 12/1958 | Klingsberg | 260—367 |

FOREIGN PATENTS

| | | |
|---|---|---|
| 1,308,796 | 10/1962 | France. |
| 57,543 | 11/1911 | Switzerland. |
| 182,403 | 5/1934 | Switzerland. |

OTHER REFERENCES

Gattermann, Liebig's Annalen, Leipzig, Germany; C. F. Winter'sche Verlagshandlung, vol. 393, pp. 113–197 (particularly pp. 118, 130, 131 and 136–139) relied on (1912).

Houben, Das Anthracen and die Anthrachinone, Leipzig, Germany; Georg Thieme Verlag, pp. 463–470 (1929).

Houben-Weyl, Methoden der Organischen Chemie; Stuttgart, Germany; Georg Thieme Verlag, vol. 9, pp. 105–107 (1955).

J. A. PATTEN, *Primary Examiner.*

H. C. WEGNER, *Assistant Examiner.*

U.S. Cl. X.R.

260—41